though these may be formed of single pieces of leather, if desired.

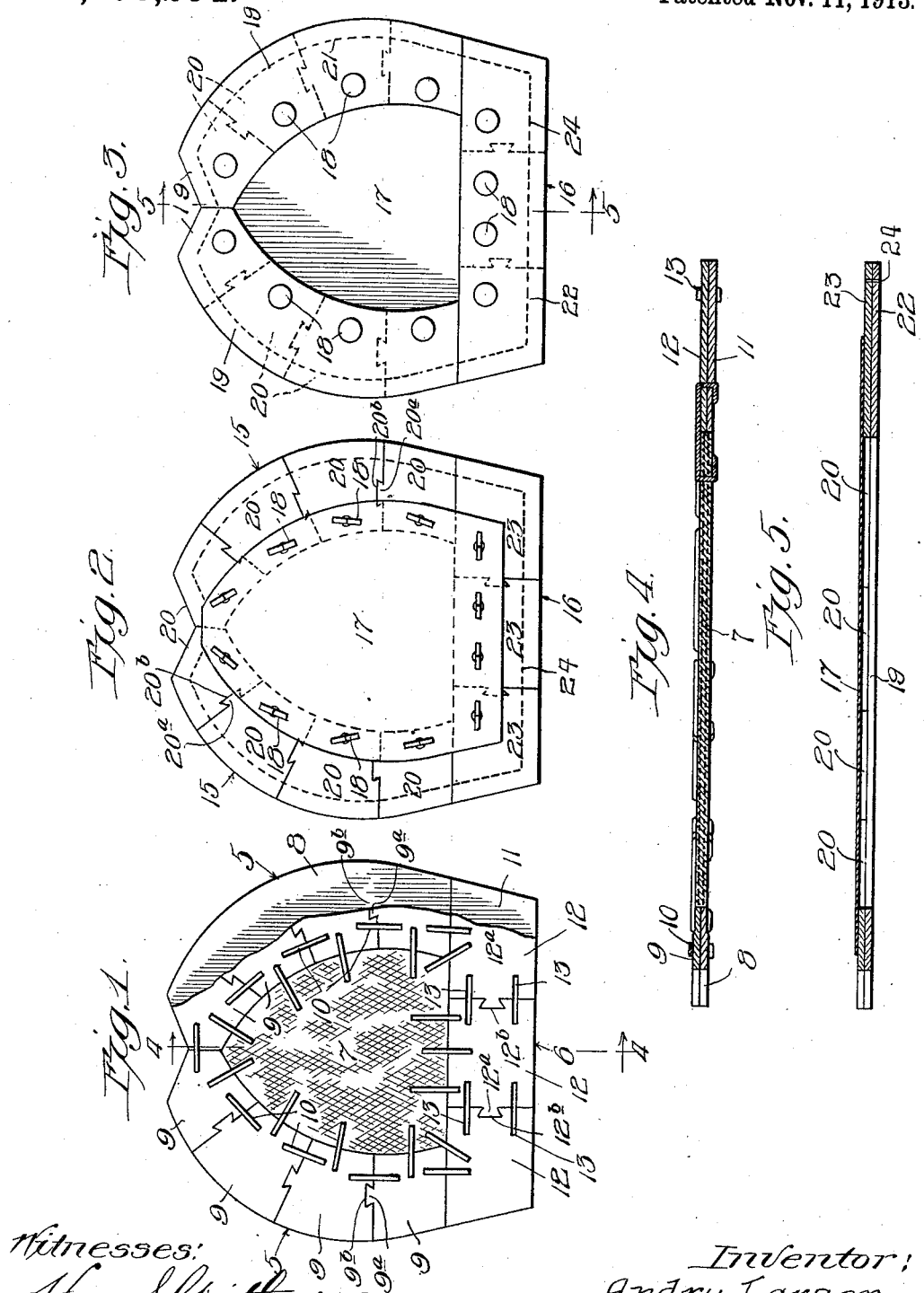

UNITED STATES PATENT OFFICE.

ANDRU LARSEN, OF CHICAGO, ILLINOIS.

HOOF-PAD.

1,078,204.　　　　Specification of Letters Patent.　　Patented Nov. 11, 1913.

Application filed April 5, 1913.　Serial No. 759,002.

*To all whom it may concern:*

Be it known that I, ANDRU LARSEN, a citizen of the United States, and a resident of Chicago, in the county of Cook and State of Illinois, have invented certain new and useful Improvements in Hoof-Pads; and I do hereby declare that the following is a full, clear, and exact description thereof, reference being had to the accompanying drawings, and to the letters of reference marked thereon, which form a part of this specification.

This invention relates to hoof pads adapted for insertion between the horse shoe and the hoof of the horse, of that class comprising a rim member of flexible material conforming generally to the shape of the shoe, and a center member joined at its margins to the inner margins of the rim member and adapted to cover or protect the frog and central parts of the bottom of the hoof.

A hoof pad embodying my invention embraces a rim member made of leather and consisting of two layers, one of said layers consisting of a continuous piece of leather and the other layer of a plurality of pieces or sections joined to each other, edge to edge, said pieces or sections being attached to the continuous piece, whereby a leather rim member may be made of a desired thickness without the use of large pieces of thick or heavy leather.

The invention consists in the matters hereinafter described and more particularly pointed out in the appended claims.

As shown in the accompanying drawings—Figure 1 is a face view of a hoof pad embodying one form of my invention; Fig. 2 is a view of a like pad provided with a central member made of sheet metal; Fig. 3 is a view of the reverse side of the pad, shown in Fig. 2; Fig. 4 is a sectional view of the pad shown in Fig. 1, taken upon line 4—4 of said Fig. 1; Fig. 5 is a sectional view of the pad as shown in Figs. 2 and 3, as taken upon line 5—5 of Fig. 3.

Referring to the form of pad shown in Figs. 1 and 4, the same consists of two laterally curved rim members 5, 5, a transversely extending heel member 6 and a center member 7. The rim members 5, 5 and heel member 6 are made of leather, and the center member 7 of leather or of a fabric consisting of layers of cloth joined to each other by rubber or other waterproof adhesive material. As shown in said Fig. 1, the rim members 5, 5, the heel member 6 and the center member 7 are arranged in the same plane with their meeting edges in abutting relation. Each curved side member 5 is made of two layers of leather, one layer consisting of a single piece 8, conforming to the shape of the said member, and the other layer consisting of a plurality of pieces or sections 9, 9, which meet each other edge to edge, or in abutting relation. The two layers are joined together by suitable securing means, shown in said Figs. 1 and 4, as consisting of metal fasteners or staples 10, 10 inserted through the two thicknesses, said staples preferably extending transversely of the joints between the sections 9, 9, and having their prongs or points inserted through adjacent sections and clenched against the same. Such staples may have their body portions on either side of the rim member, but as shown, their said body portions rest against the sectional layer 9. As a preferable construction in the layer consisting of the sections 9, 9, said sections are joined to each other at their meeting edges by interfitting tongues or notches on the meeting margin of adjacent sections. As shown, each section is provided with a dovetailed tongue $9^a$, which fits within a correspondingly shaped notch $9^b$ in an adjacent section. The heel member 6 is made up of two layers in the same manner described in connection with the curved section 5. Said heel section consists of a continuous layer 11, and a sectional layer formed by a plurality of small pieces or short sections 12, 12, 12. The sections 12, 12 are joined to each other and to the continuous layer 11 by means of metal fasteners or staples 13, 13, extending across the joints between the sections, as before described. Said sections 12 are also further joined at their meeting margins by means of a dovetailed tongue $12^a$ on each section, which fits within a correspondingly shaped notch $12^b$ in an adjacent section.

In the form of construction shown in Figs. 2, 3 and 5, the pad consists of two curved rim members 15, 15, a transversely extending heel member 16 and a central metal plate 17. Said metal plate is arranged with its margins in overlapping relation to the inner margins of the members 15 and 16 and is secured thereto by rivets 18, 18. In this instance, as is clearly seen in Fig. 5, each member 15 consists of two layers of leather, one layer 19 consisting of a continuous piece corresponding in shape with that of the said member, and the other layer consisting of a plurality of pieces or sections 20, 20, 20. Said sections 20, 20 may, if desired, be joined at their meeting edges by projections 20ª of dovetailed form, fitting within notches 20ᵇ of like form. As a means for permanently connecting the two layers, consisting, in one instance, of the continuous piece 19 and in the other instance of the plurality of sections 20, 20, said parts are joined by sewing or stitching through the two layers. As shown, a line of stitches 21, 21 is inserted through the two layers, preferably near the outer margin of the same. The heel piece 16 similarly consists of a continuous piece or strip 22 and a plurality of pieces or sections 23, 23; said layers being joined by sewing. As illustrated, a line of stitching 24, extends along the rear end margins of said heel section.

By the construction described in the rim or marginal part of the pad, the same may be made of leather, and of the necessary thickness for its intended use as a cushioning means between the horse shoe and the horse's hoof, without the use of any large and thick pieces of leather. Moreover, by joining the pieces or sections of the sectional layer with each other and also permanently uniting all of the pieces or sections with the continuous layer, the rim and heel piece will have practically the same strength and durability as though each were made of a single piece of thick leather.

It will be understood that where metal staples are used for joining the two thicknesses of the lateral rim members, said staples will be placed near the inner margins of the same, so that they will not come between the shoe and hoof when the shoe is applied. When, however, the sections constituting the sectional layer, are joined to the continuous layer by stitching, the lines of stitches may be located at any desired place, as they do not increase the thickness of the rim members.

It will be understood that the form of the parts and other details thereof may be variously modified in practice, and I do not desire to be limited to the particular details of construction illustrated except as pointed out in the appended claims.

I claim as my invention:

1. A hoof pad comprising a rim and center member, said rim member embracing two layers of flexible material, one of said layers consisting of a series of sections, which meet each other edge to edge, and the other of said layers extending over a plurality of said sections, said layers being permanently connected with each other.

2. A hoof pad comprising a rim and a center member, said rim embracing two layers of flexible material, one of said layers consisting of a plurality of pieces or sections, which meet each other edge to edge and are joined to each other, and the other layer consisting of a piece of flexible material extending over a plurality of said pieces or sections, the sections constituting the sectional layer being permanently united to each other and to the other layer.

3. A hoof pad comprising a rim consisting of two laterally curved members, a center member and a transverse heel member, each of said laterally curved members and the heel member consisting of two layers, one of which consists of a plurality of pieces or sections arranged with their meeting margins in abutting relation; said layers being joined to each other by fastening means extending therethrough.

4. A hoof pad comprising a rim and a center member, said rim embracing two layers of flexible material, one of said layers consisting of a plurality of pieces or sections arranged edge to edge in abutting relation and provided on their meeting edges with interfitting tongues and notches, said layers being joined to each other by connecting means extending through said layers.

In testimony, that I claim the foregoing as my invention I affix my signature in the presence of two witnesses, this 31st day of March A. D. 1913.

ANDRU LARSEN.

Witnesses:
EUGENE C. WANN,
M. F. ANTHONY.